Oct. 21, 1941.   C. T. WALTER   2,260,244
CASING DRYING MEANS
Original Filed Nov. 21, 1936   3 Sheets-Sheet 1
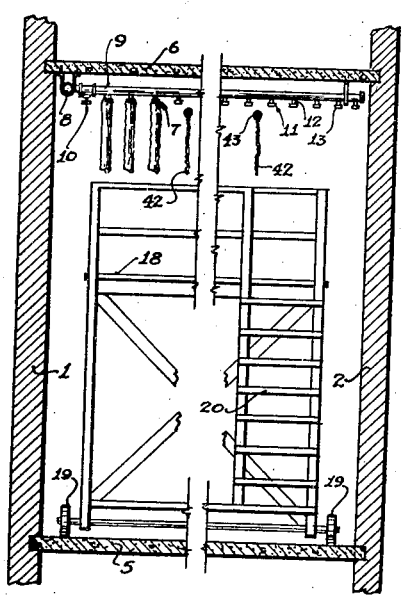
Fig. 1
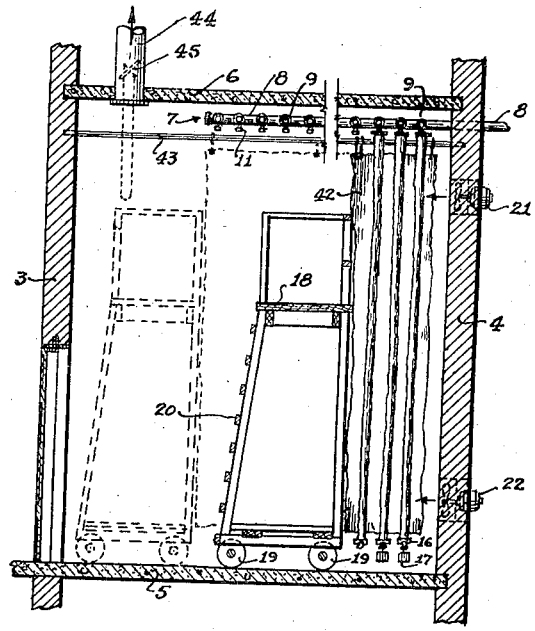
Fig. 2
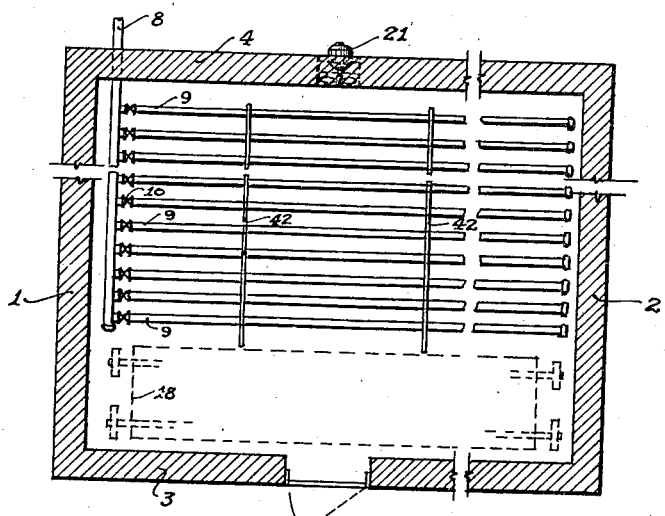
Fig. 3
Charles T. Walter
Inventor
ATTEST
by 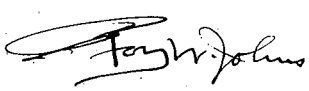
Attorney Oct. 21, 1941.  C. T. WALTER  2,260,244

CASING DRYING MEANS

Original Filed Nov. 21, 1936  3 Sheets-Sheet 2

Charles T. Walter
Inventor

ATTEST-

Wm. C. Meise by Tony W. Johns
Attorney

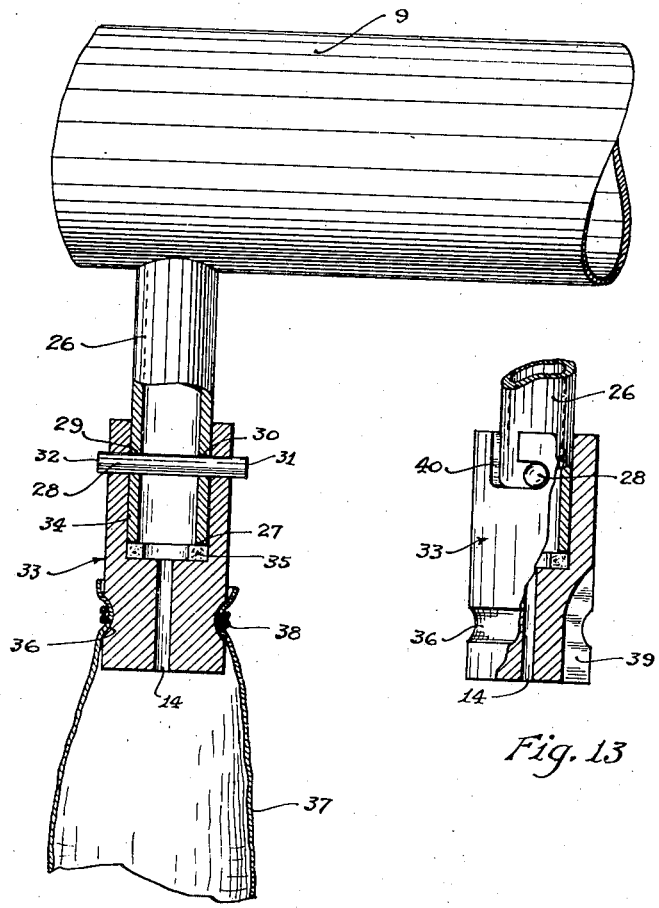

Patented Oct. 21, 1941

2,260,244

UNITED STATES PATENT OFFICE 2,260,244

CASING DRYING MEANS

Charles T. Walter, Chicago, Ill., assignor to Industrial Patents Corporation, Chicago, Ill., a corporation of Delaware Original application November 21, 1936, Serial No. 112,178, now Patent No. 2,148,885, dated February 28, 1939. Divided and this application August 24, 1938, Serial No. 226,512

7 Claims. (Cl. 34—104)

This invention relates to a casing drying means.

This application is a division of my application, Serial No. 112,178, filed November 21, 1936, now matured into Patent No. 2,148,885 of Feb. 28, 1939, entitled Drying casings.

One of the objects of the invention is to provide an improved casing drying means.

Another object of the invention is to provide means for drying casings for printing.

Other objects of the invention will be apparent from the description and claims which follow.

In order to print natural sausage casings which are derived from intestines of edible animals, it is necessary to process the casings to a comparatively dry, smooth condition.

The present invention is applied to casings which have been processed in the usual manner as by stripping, desliming and defatting.

It is conventional practice to pack casings, after cleaning, in wet salt for storage before the casings are used in the manufacture of sausage. Excessive salt is removed by a water bath and the casings stuffed out in a wet condition.

In order to prepare the casings for printing as where it is desired to print the casings in accordance with the teachings of my Patent No. 2,054,148 entitled Sausage and casing therefor, or in accordance with the teachings of my co-pending application entitled Treatment of casings, Serial No. 23,664, filed May 27, 1935, it is necessary to dry the casings to a comparatively dry, smooth condition.

The present invention will be described by way of illustration, but not by way of limitation, as applied to the drying of beef middles and similar casings.

When casings are dried in contact with solid material, the membrane tends to adhere firmly to the solid material, rendering it difficult to remove the dried casing from the stripping means. Although this difficulty may be largely obviated by oiling the stripping means, the presence of oil on casings is objectionable if the casing is to be printed since oil tends to mix with the ink and inhibit the drying of the ink.

When casings are dried in a hot atmosphere, the heat tends to render the fat in the casing, depositing oil on the surface which interferes with the drying of the ink. The objection to the use of hot air renders it necessary to employ cool air with a corresponding decrease in room capacity.

The present invention tends to overcome this objection to the employment of cool air by utilizing the full volume of the drying chamber.

The invention will be understood by reference to the accompanying drawings in which similar reference characters in the several figures indicate similar elements.

Figure 1 is a sectional view of a drying room.

Figure 2 is a sectional view of the drying room shown in Figure 1.

Figure 3 is a horizontal sectional view taken just below the ceiling of the drying room.

Figure 8:
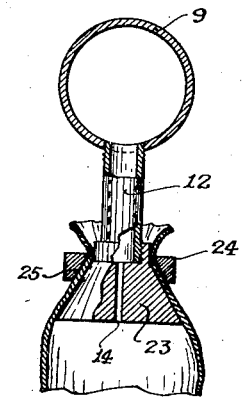

Figure 8 discloses a manner of affixing a casing to an air nozzle.

Figure 9:
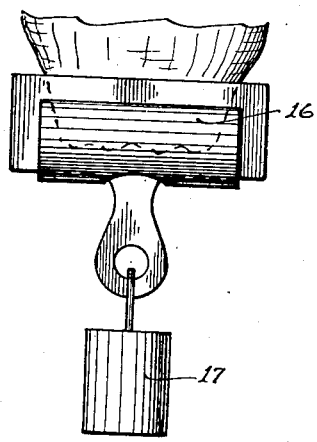

Figure 9 is a front view of a bottom clip and weight.

Figure 10:
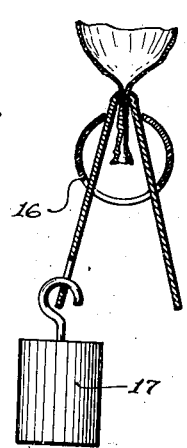

Figure 10 is a side view of the bottom clip and weight shown in Figure 9.

Figure 11:
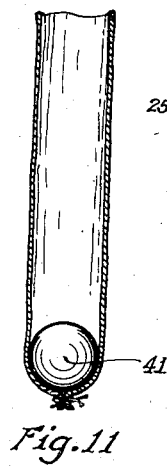

Figure 11 is a sectional view of a casing stretched by means of a ball weight.

Figure 12 is a view, partly in section, showing another modification of an air nipple and nozzle with a casing in position.

Figure 13 is a detailed view, partly in section, of the nipple and nozzle shown in Figure 12.

Referring now more particularly to Figures 1, 2 and 3, it will be noted that the drying room is defined by side walls 1, 2, 3 and 4, floor 5 and ceiling 6. It is desirable to utilize a drying room having a ceiling height of about 12 to 15 feet in order to accommodate reasonably long casing lengths.

Figure 4:
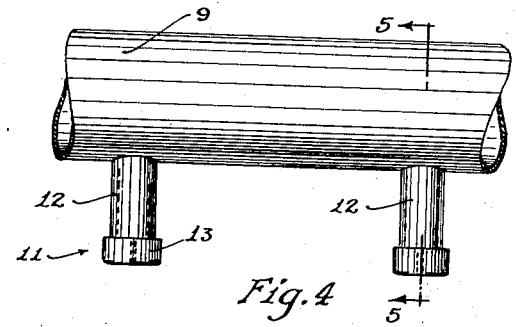
Figure 4 is a detail of an air pipe provided with nozzles.
Figure 5:
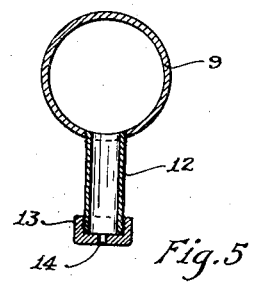
Figure 5 is a section on the line 5—5 of Figure 4.

Inflation apparatus 7 is affixed close to the ceiling and is the apparatus for supporting and inflating the casings. This apparatus consists of header 8 having auxiliary branch headers 9 each of which is provided with a valve 10 so that each auxiliary header may be shut off from the main header 8. Each of the auxiliary headers 9 is provided with a series of nozzles 11, shown in the drawings as comprising a short pipe nipple 12 fitted with a standard cap 13 through which has been drilled a small hole 14, as will be readily apparent by preference to Figure 5. The hole 14 is preferably about one-eighth to three-sixteenths of an inch in diameter.

Main header 8 is supplied with compressed air at low pressure through any convenient form of reducing valve, the preferred air pressure employed in the system being between 12 inches and 18 inches of water. An effective pressure control valve for use in the system is an open-end pipe connected with the system and having the open end of the pipe submerged 12 to 18 inches below the surface of a vessel of water.

Figure 6:
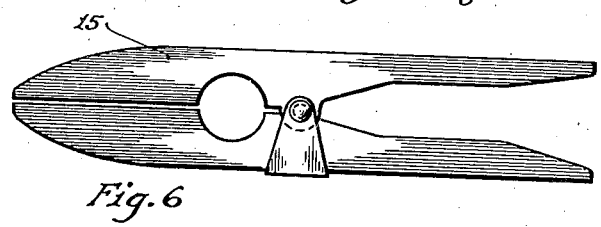
Figure 6 is a side view of a clamp which may be utilized for fastening a casing to an air nozzle.
Figure 7:
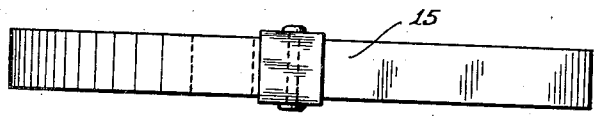
Figure 7 is a plan view of the clamp shown in Figure 6.

Casings to be dried are prepared in the conventional manner but are not salted. The unsalted casings are cut into such lengths as may be readily accommodated by the height of the drying room; for example, 12 feet. One end of the wet casing is slipped over a nozzle 11 and fastened in place as by means of clamp 15 shown in Figures 6 and 7. The bottom of each casing may be sealed as by clip 16 to which is attached weight 17 as shown in Figures 9 and 10.

After all the nozzles on one auxiliary header have been provided with a casing, valve 10 may be opened, permitting air in the auxiliary header 9 to flow into each individual casing and fully inflate the casing. Since both ends of each casing are closed, there is very little air flow through the system although a small amount of leakage may occur by reason of small holes and the like in the casing. This small amount of leakage is readily handled by the air compressor system.

In the event that a casing develops excessive leakage, as by tearing, loss of substantial quantities of air from the system is prevented by the throttling action of small hole 14 in nozzle 11. Hole 14 is large enough to admit more than the amount of air necessary to produce inflation in a tight casing, but is small enough to prevent a substantial reduction in air line pressure in the event a casing mounted on any particular nozzle becomes torn or is removed.

In order to facilitate the operations of filling the drying room and removing dried casings, a movable platform 18 mounted upon wheels 19 may be employed. If desired, the platform may be of the type shown in Figures 1 and 2, long enough to extend the full length of the room and arranged so that it may be moved the entire width of the room. A platform of this type permits an operator to mount the platform by means of ladder rungs 20 with a sufficient supply of casings and fastening devices to quickly attach a casing to each of the nozzles on one of the auxiliary headers. When an auxiliary header is completely loaded, the control valve 10 for that particular header is opened, the casings on that header inflated, and the drying operation commenced. The platform 18 is then moved slightly away from the first line of casings and the next line hung. Air circulating fans 21 and 22 are provided to facilitate drying. Circulation may be assisted by use of curtains 42 suspended from rods 43. Exhaust vent 44 is provided with damper 45.

As soon as the casings are dried on any auxiliary header, the control valve 10 of that header is closed and the casings removed.

The employment of weight 17, although not essential to the drying of the casings, effectively holds casings straight and results in a better yield of straight casings suitable for printing. With a 12 foot beef middle, a one to two pound weight is employed.

One means for attaching a casing to a nozzle is shown in Figure 8. In this modification, nipple 12 is provided with tapered cap 23 having air hole 14. One end of the casing is pulled up over cap 23 and threaded through the heavy ring 24 which has an inside bevel 25 corresponding to the taper of cap 23. The ring is then dropped, wedging the casing between the cap 23 and the ring.

A preferred nozzle arrangement is shown in Figures 12 and 13. Pipe 9 is provided with a plurality of small diameter tubes 26 having faced ends 27 and provided with a pin 28 tightly fitted in holes 29 and 30 drilled through tube 26. Ends 31 and 32 of pin 28 extend beyond the outer surface of tube 26. Nipple 33 is preferably fabricated from a light weight metal such as aluminum. Hole 34 in nipple 33 provides a loose fit over the end of pipe 26. A rubber washer 35 in the bottom of hole 34 contacts machine face 27 of pipe 26 in order to seal the joint against leakage of low pressure air into the system. Groove 36 is formed in the outside surface of nipple 33 near its lower end, as clearly shown in Figure 13. Casing 37 is firmly fastened to the nipple by any means, such as a strong cord 38 tied around the casing at groove 36. A longitudinal slot 39 of sufficient width to accommodate a knife extends just under the smallest diameter of groove 36 in order to permit ready insertion of a knife for cutting cord 38 for removal of the stub end of the casing after the casing has been dried.

In employing the apparatus shown in Figures 12 and 13 in the drying of casings, an operator's bench is equipped with supporting elements corresponding in size to tubes 26. The operator attaches a nipple 33 to each one of the supporting elements or brackets, which is done by slipping the nipple over the end of the bracket and giving it a part turn to lock slot 40 around a pin corresponding to pin 28. The operator then picks up a casing and with both hands free slips it over the end of the nipple and ties it in place with cord 38. The other end of the casing is closed with a clip or tied with a loop of cord left hanging for the attachment of a suitable weight. If desired, before the casing is mounted on the nipple, the other end of the casing may be tied and a ball weight 41 dropped into the casing, as is shown in Figure 11.

After a sufficient number of casings have been provided with nipples, the casings are taken to the drying room and the nipples fastened to tubes 26 by the simple operation of pushing the nipple over the tube and giving it a part turn to lock slot 40 on pin 28. The nipple is provided with hole 14 to permit communication between the air supply and the interior of the casing.

In ordinary practice, the casings when dried are removed and soaked in water to overcome the tendency of the stub end of the casing to stick to the nipple.

When it is desired to re-use the nipple, it is mounted upon a bracket on the operator's table, cords 38 cut with a knife inserted in slot 39, the cut cords and the stub end of the casing discarded, and the operation of attaching a casing to the nipple repeated.

The present invention contemplates maintaining casings under constant air pressure during the drying period to compensate for loss of air through small openings in the casing wall. It will be apparent, therefore, that the present invention employs a novel method of drying casings, and provides a novel apparatus for carrying out the method.

I claim:

1. In a natural casing drying apparatus a source of constant air pressure, an air manifold connected therewith, which manifold is provided with auxiliary headers, control valves at each of said auxiliary headers, a plurality of nozzles in each of said auxiliary headers, said nozzles having an air outlet therein and means for securing the open ends of the casings over the nozzles.

2. In a natural casing drying apparatus a source of constant air pressure, an air manifold connected therewith, which manifold is provided with auxiliary headers, control valves at each of said auxiliary headers, a plurality of nozzles in each of said auxiliary headers, said nozzles having a relatively small aperture for the emission of compressed air and means for securing the open ends of the casings over the nozzles.

3. In a natural casing drying apparatus a source of constant low air pressure, an air manifold connected therewith, which manifold is provided with auxiliary headers, control valves at each of said auxiliary headers, a plurality of nozzles in each of said auxiliary headers, said nozzles having relatively small air outlets therein and means for securing the open ends of the casings over the nozzles.

4. In a natural casing drying apparatus a source of constant air pressure at a pressure of approximately twelve to eighteen inches of water, an air manifold connected therewith, which manifold is provided with auxiliary headers, control valves at each of said auxiliary headers, a plurality of nozzles in each of said auxiliary headers, each of said nozzles having an air passage therein of approximately three sixteenths inch diameter and means for securing the open ends of the casings over the nozzles.

5. An apparatus for drying natural casings, which tend to leak when inflated, comprising a manifold in communication with a low pressure compressed gas system, means in communication with said manifold adapted for injecting the gas into an open end of each casing, the other end of which is closed, to cause inflation thereof, said means containing openings of sufficient smallness in relation to the capacity of the compressed air to prevent a substantial reduction in pressure of the gas in the manifold in the event that excessive leakage occurs in one or more of said casings and means for securing the open ends of the casings over said openings.

6. An apparatus for drying natural casings comprising one or more headers in communication with a common source of compressed air, means for supplying an excess of compressed air to said headers under substantially constant pressure, nozzles in said headers for injecting air into the casings and small apertures in said nozzles, said apertures being small enough to prevent a substantial reduction in the air pressure in said headers in the event a casing mounted thereon develops a leak and means for securing the open ends of the casings over the nozzles.

7. An apparatus for drying natural casings, comprising a manifold, means for supplying an excess of compressed air to said manifold, one or more headers connected to said manifold, nozzles in said headers for injecting air into casings mounted thereon and orifices in said nozzles of sufficient smallness to prevent a depletion of said supply of compressed air in said manifold in the event a casing mounted on one of said nozzles develops a leak and means for securing the open ends of the casings over the nozzles.

CHARLES T. WALTER.